April 6, 1954   W. A. KING   2,674,223
LAYER CAKE ICING MACHINE
Filed April 9, 1952
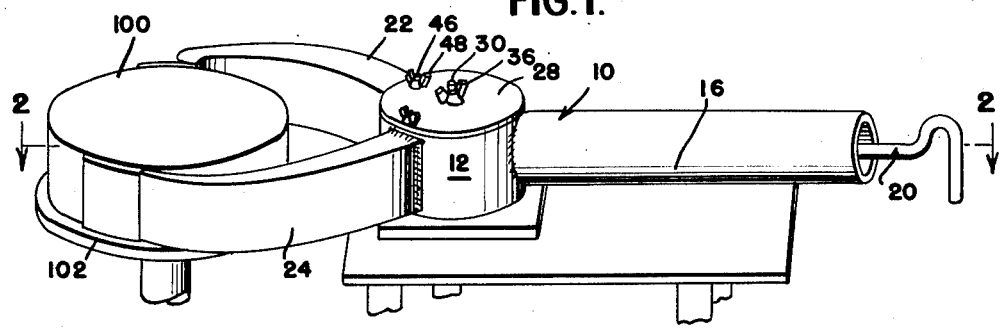
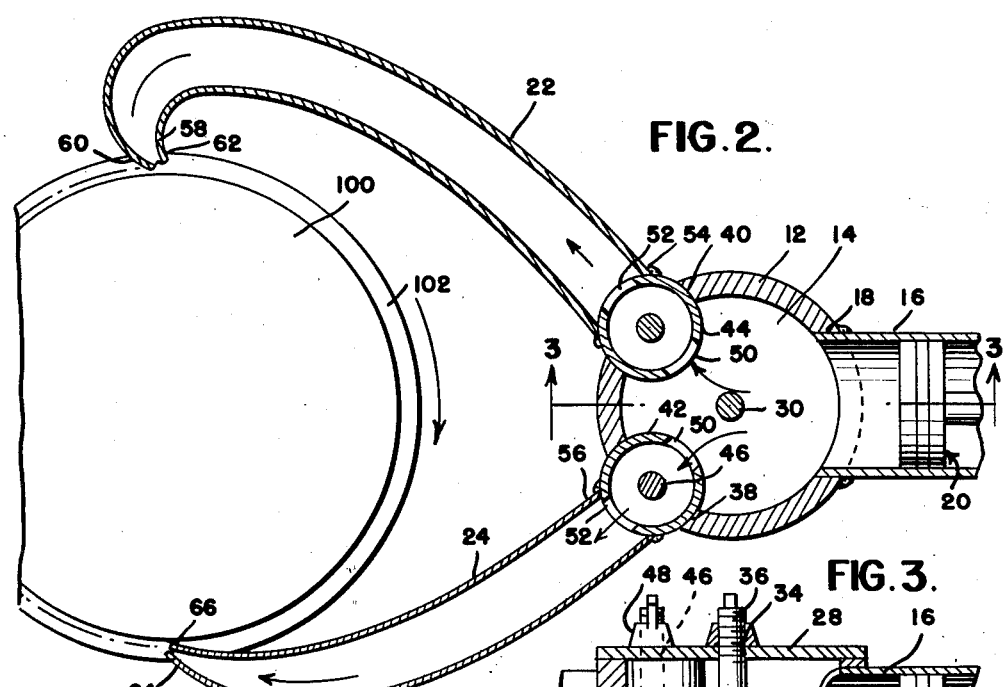
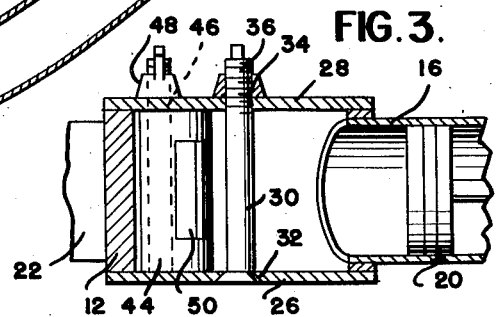
INVENTOR
WILLIAM A. KING
BY Wilkinson Mawhinney
ATTORNEYS Patented Apr. 6, 1954

2,674,223

UNITED STATES PATENT OFFICE 2,674,223

LAYER CAKE ICING MACHINE

William A. King, Forty Fort, Pa.

Application April 9, 1952, Serial No. 281,361

5 Claims. (Cl. 118—16)

This invention relates to improvements in machines for automatically icing the sides of round cakes and has for its primary object to provide means whereby a measured amount of icing is applied to the sides of the cake and simultaneously smoothed onto the sides of the cake by a wiping or rubbing action.

Another object of this invention is to provide a pair of cooperative extrusion tubes, which are disposed at diametrically opposite points of the sides of a cake, which is rotated in one direction between the tubes, the tubes being so designed that the icing is extruded in the same direction as rotation of the cake, thereby avoiding slipping of the cake on its turntable and enabling the cake to rotate without a drag being imposed thereon from the tubes.

A further object of this invention is to provide means for securing a faster icing operation, since the tubes, which extrude the icing onto the sides of the cake at diametrically opposite points and in the same direction as rotation of the cake, permit the cake to be rotated only half a turn in completely icing the sides of the cake.

Another object of this invention is to provide means for mounting the extrusion tubes on a distributing or feeding chamber and in communication therewith, the mounting means permitting the tubes to move freely against the sides of the cake and away from the sides of the cake after the cake is iced.

These and ancillary objects and structural features of merit are attained by this invention, the preferred embodiment of which is set forth in the following description and illustrated in the accompanying drawing wherein:

Fig. 1 is a perspective view of a manually operated icing machine, constructed in accordance with this invention;

Fig. 2 is an enlarged longitudinal sectional view taken on line 2—2 of Fig. 1, and, Fig. 3 is a detailed longitudinal vertical section taken on line 3—3 of Fig. 2.

Referring now more particularly to the accompanying drawing, the icing machine 10 includes a hollow circular body or support 12, which defines a distributing or feeding chamber 14. Radially extending rearwardly from the body 12 is a feed conduit 16, which has its inner end fixedly mounted in an opening 18 in the peripheral wall of the body 12, so that the conduit is communicated with the chamber 14.

As illustrated in the drawing, a hand plunger 20 may be used for forcing icing from the conduit 16 into the chamber 14 and from the chamber through a pair of cooperative extrusion tubes 22 and 24. However, the plunger 20 is merely one type of pump means, since the conduit 16 can be connected by a pump to an icing hopper or other source point for a completely automatic operation of the machine.

The body 12 includes a detachable circular bottom plate 26 and a similar detachable top plate 28, the plates being clamped on the lower and upper edges of the peripheral wall of the body by means of a bolt 30. The head of the bolt is countersunk in a bore 32 centrally formed in the bottom plate 26 and the threaded shank extends through a center opening 34 in the top plate 28. A wing nut 36 is threaded on the extending end of the bolt to clamp the bottom and top plates on the edges of the peripheral wall.

An opening 38 is formed in the peripheral wall forwardly of the conduit 16 and a similar opening 40 is formed in the wall, the openings 38 and 40 being spaced apart and being in divergent relation to the conduit 16. Hollow cylindrical trunnions 42 and 44 are rotatably mounted in the openings 38 and 40 and have their closed top and bottom walls rotatably engaged with the inner surfaces of the top and bottom plates 28 and 26. Bolts 46 form the pivots for the trunnions, the shanks of the bolts passing vertically through the trunnions and the heads thereof being countersunk in the bottom plate 26, with the threaded ends receiving wing nuts 48 above the top plate 28.

Diametrically aligned openings 50 and 52 are formed in the peripheral wall of the trunnions, the openings 50 being formed in the portion of the trunnions rotated within the chamber 14 and the openings 52 being formed in the portion of each trunnion disposed exteriorly of the body 12. The inner open end 54 of the extrusion tube 22 is welded or otherwise rigidly secured to the peripheral wall of the trunnion 44 in a manner to encompass the opening 52, so that the tube 22 is communicated with the chamber 14 by means of the openings 50 and 52 in the trunnion 44. Similarly, the open inner end 56 of the extrusion tube 24 is welded to the peripheral wall of the trunnion 42 in a manner to encompass the opening 52 therein, so that the openings 50 and 52 in the trunnion 42 communicate the tube 24 with the feed or distributing chamber 14.

The welded inner ends of the tubes limit the rotative movement of the trunnions about the pivots 46 by engaging the peripheral wall of the body on opposite sides of the openings 38 and 40. The trunnions can be locked against rotation by tightening the wing nuts 48 on the bolts 46 so as to bind the top and bottom walls of the trunnions against the top and bottom plates of the body 12. The tubes are designed so that they are in cooperating, confronting relation and are supported by the body 12 in a manner to move freely from opposite directions against the sides of the cake 100 and away from the sides after the cake is iced.

The cake 100 is supported by a turntable 102 between the extrusion tubes 22 and 24 and is rotated a half turn during the application of the icing and, as seen in Fig. 2, the cake is rotated in a clockwise direction. The tubes 22 and 24 are designed so that the icing is extruded in the same direction as the rotation of the cake. The tube 22 terminates in a rearwardly directed and inturned tapered nozzle 58, so that the icing is extruded from the tube in the direction of rotation of the cake and the outer side wall 60 of the tube is almost contiguous with the sides of the cake to define a spreader or smoother, while the inner side wall 62 of the nozzle is spaced outwardly therefrom. The orifice of the nozzle, constructed by the tapering and curvature of the side walls of the nozzle, is arranged so that the icing is extruded at an angle to the sides of the cake in the direction of rotation of the cake.

The tube 24 terminates in a tapered nozzle 64, which is formed by the tapered side walls that are slightly inturned from the end 56 of the tube and the nozzle is arranged to extrude the icing forwardly of the tube 24 and in the direction of rotation of the cake 100, the side wall 66 forming a spreader or smoother.

In operation, the cake 100 is seated on the turntable 102, which may form a part of a continuous conveyor system, so that the cake is automatically disposed on the turntable for rotation between the pivotally mounted extrusion tubes 22 and 24. The tubes 22 and 24 are swung relative to each other about their pivots 46 to bring the nozzle ends 58 and 64 of the tubes into adjacency to the sides of the cake 100. The tubes are adjustably mounted, so that the distance between the nozzle ends can be adjusted to accommodate cakes of various diameters. The nozzle ends 58 and 64 are disposed so that the outer side wall of the nozzle 58 and the inner side wall of the nozzle 64 are slightly spaced from the side walls of the cake in a manner to smooth or spread the icing on the side walls, as the icing is extruded from the tubes and the cake 100 is rotated in a clockwise direction. The icing is forced under pressure, either by the plunger 20 or by an automatic pump, into the distributing chamber 14 and through the tubes 22 and 24.

It will be noted that the plates 26 and 28 are detachable from the body 12 and that the trunnions 42 and 44 can be removed from the openings in the peripheral wall of the body, so that all of the parts of the icing machine can be thoroughly cleaned.

It will be noted that the width of each opening 38 and 40 in the peripheral wall 12 is less than the diameter of the trunnions so that only by removing either the top plate 28 or bottom plate 26 can the trunnions 42 and 44 be removed and then by sliding them axially. In the same way the machine is assembled and the trunnions are introduced into the openings axially.

The tubes 22 and 24 are rotatable in the openings 38 and 40 about the axes 46 in a limited manner so as to swing toward and away from each other and are, therefore, adjustable to accommodate between their nozzles 58 and 64, cakes of various diameters. The tubes are aligned with the line of thrust and lie in the same horizontal plane as the feed conduit 16.

Of course, by adjusting the stroke of the plunger, the amount of icing forced through the tubes 22 and 24 is controlled, and in an automatic unit valves or similar control means may be provided for accomplishing the same purpose.

Although I have disclosed herein the best form of the invention known to me at this time, I reserve the right to all such modifications and changes as may come within the scope of the following claims.

What I claim is:

1. In a cake icing machine, a distributing chamber, means for feeding cake icing under pressure to said chamber, a pair of cooperatively arranged and independently swingably mounted extrusion tubes communicating with said chamber, said tubes terminating in nozzle ends being swingable toward and away from each other and between which a cake may be supported for rotation in one direction, said nozzle ends being directed toward the direction of rotation of the cake.

2. In a machine for icing the round sides of a cake, a body defining a distributing chamber and having a peripheral wall and open top and bottom walls, removable plates closing said top and bottom walls, a feed conduit connected to said peripheral wall and communicating with the chamber, pump means associated with said feed conduit, a pair of extrusion tubes, means mounting the tubes on the peripheral wall for limited swinging movement toward and away from each other and in communication with the chamber, said tubes terminating in nozzles between which a cake may be supported for rotation in one direction, the nozzle of one tube being inturned and directed in the direction of rotation of the cake and the nozzle of the other tube being slightly incurved and directed in the direction of the cake.

3. In a machine for icing the round sides of a cake, a body defining a distributing chamber, a feed conduit connected to the body in communication with the chamber, pump means associated with the feed conduit, a pair of cooperative confronting extrusion tubes, and means mounting the tubes on the body for movement toward and away from each other and in communication with the chamber and downstream in divergent relation with the feed conduit, said mounting means comprising an independent rotatable mounting for each tube.

4. In a machine for icing the round sides of a cake, a body defining a distributing chamber, a feed conduit connected to the body in communication with the chamber, pump means associated with the feed conduit, a pair of cooperative confronting extrusion tubes, and means mounting the tubes on the body for movement toward and away from each other and in communication with the chamber and downstream in divergent relation with the feed conduit, said mounting means comprising an independent rotatable mounting for each tube, said tubes having nozzles at their outer ends with open mouths pointed in substantially the same rotary direction.

5. The combination of claim 2, wherein said mounting means includes a pair of hollow cylindrical trunnions, said peripheral wall having spaced openings rotatably receiving the trunnions, means rotatably mounting the trunnions in the openings, each of said trunnions having a portion always disposed inside the chamber and a portion disposed outside, said portions having aligned openings and means attaching the tubes to the outer portion of the trunnions so that the tubes encompass the openings in said outer portions.

References Cited in the file of this patent

UNITED STATES PATENTS

| Number | Name | Date |
|---|---|---|
| 1,618,053 | Cates | Feb. 15, 1927 |
| 1,859,971 | Keck | May 24, 1932 |
| 2,481,242 | Reget | Sept. 6, 1949 |
| 2,553,191 | Hettinger | May 15, 1951 |